(12) United States Patent
Viswanathan et al.

(10) Patent No.: US 8,955,982 B2
(45) Date of Patent: Feb. 17, 2015

(54) VIRTUAL SEGMENTATION OF INTERACTIVE SCANNING LASER PROJECTOR DISPLAY

(71) Applicant: Microvision, Inc., Redmond, WA (US)

(72) Inventors: P. Selvan Viswanathan, Bellevue, WA (US); Jari Honkanen, Monroe, WA (US)

(73) Assignee: Microvision, Inc., Redmond, WA (US)

( * ) Notice: Subject to any disclaimer, the term of this patent is extended or adjusted under 35 U.S.C. 154(b) by 408 days.

(21) Appl. No.: 13/626,365

(22) Filed: Sep. 25, 2012

(65) Prior Publication Data

US 2014/0085610 A1    Mar. 27, 2014

(51) Int. Cl.
     *G03B 21/28*      (2006.01)

(52) U.S. Cl.
     USPC ................ 353/42; 353/79; 353/121; 346/156

(58) Field of Classification Search
     USPC ............ 353/42, 121, 122; 345/156, 173, 175, 345/179; 359/196.1–226.3; 715/211, 230, 715/232, 231, 716, 730, 731, 732
     See application file for complete search history.

(56) References Cited

U.S. PATENT DOCUMENTS

| | | | |
|---|---|---|---|
| 7,768,505 B2* | 8/2010 | Ishihara | 345/175 |
| 8,818,027 B2* | 8/2014 | Forutanpour et al. | 382/103 |
| 2010/0026960 A1* | 2/2010 | Sprague | 353/28 |
| 2014/0232699 A1* | 8/2014 | Viswanathan et al. | 345/179 |

* cited by examiner

*Primary Examiner* — William C Dowling
(74) *Attorney, Agent, or Firm* — Kevin D. Wills

(57) ABSTRACT

Regions are defined in projected content to create a virtually segmented display. When reflections are received from objects within a defined region, the reflections are recognized and passed to a user interface circuit. When reflections are received from objects outside a defined region, the reflections are gated and not recognized.

22 Claims, 9 Drawing Sheets

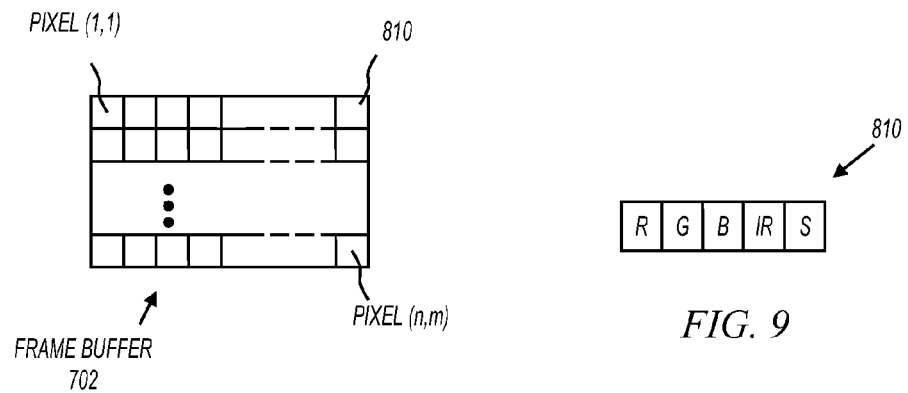
FIG. 8
FIG. 9
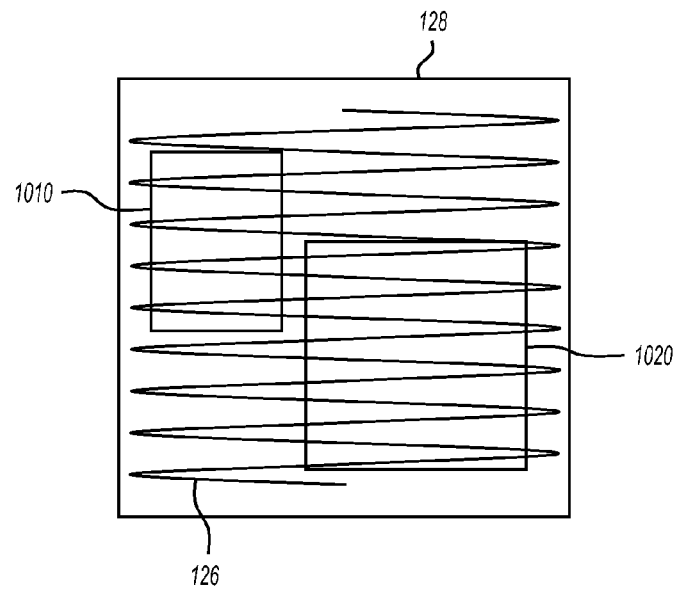
FIG. 10

VIRTUAL SEGMENTATION OF INTERACTIVE SCANNING LASER PROJECTOR DISPLAY

FIELD

The present invention relates generally to scanning laser projectors, and more specifically to interactive scanning laser projection displays.

BACKGROUND

Projection systems typically project a visible image on a surface. For example, a projection system may project the contents of a computer display on a wall. Some projection systems include a camera and image processing circuits to allow a user to interact with projected content. The image processing circuits compare the projected content to an image captured by the camera to determine the extent of user interaction.

BRIEF DESCRIPTION OF THE DRAWINGS

FIGS. 8 and 9 show frame buffer contents in accordance with various embodiments of the present invention;

FIGS. 10-12 show examples of virtual segmentation of displays in accordance with various embodiments of the present invention;

DESCRIPTION OF EMBODIMENTS

Figure 1:
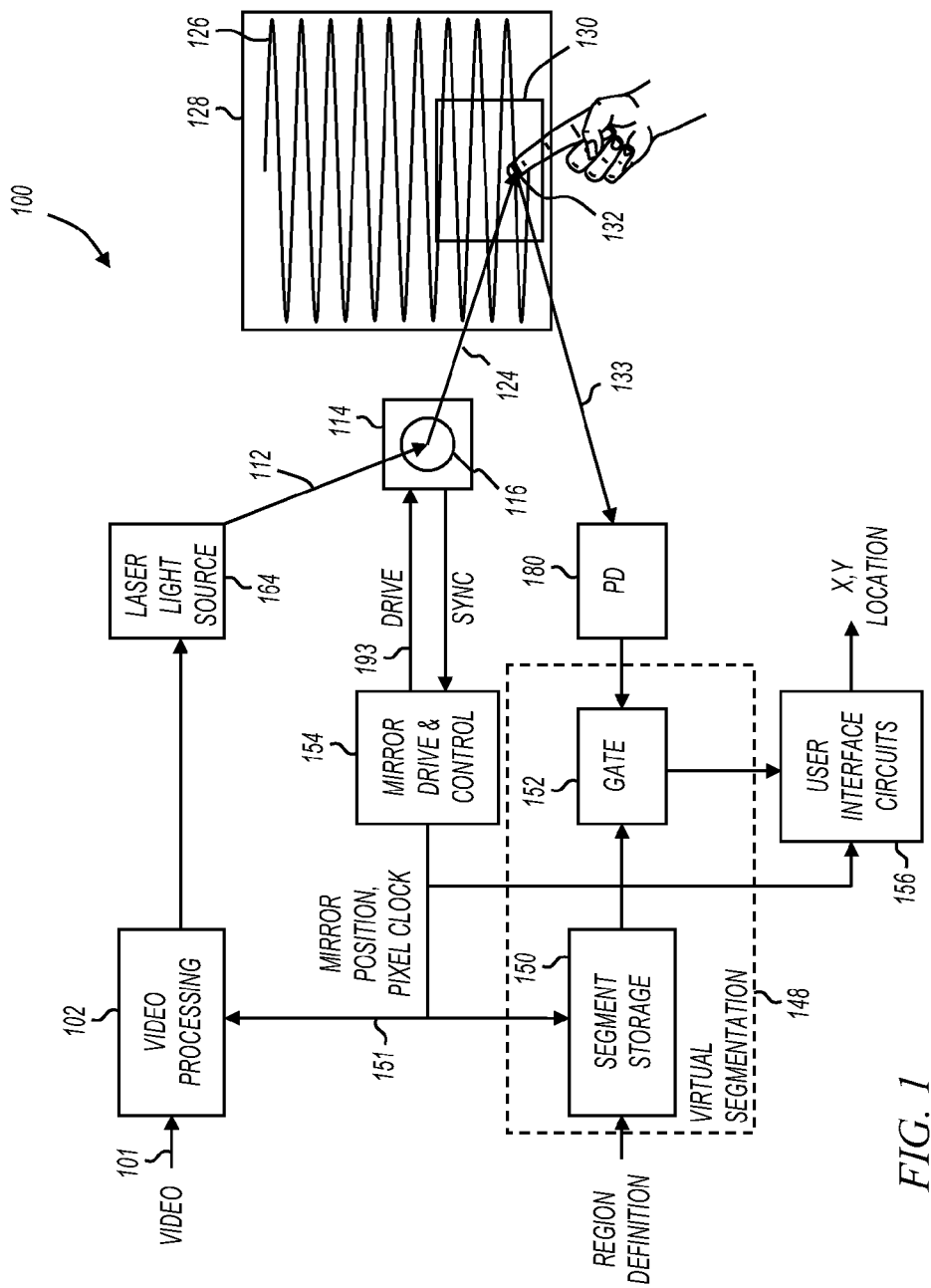
FIG. 1 shows a projection apparatus with virtual segmentation of the display in accordance with various embodiments of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 shows a projection apparatus with virtual segmentation of the display in accordance with various embodiments of the present invention. As shown in FIG. 1, apparatus 100 includes video processing component 102, laser light source 164, scanning platform 114, photodetector 180, virtual segmentation circuits 148, and user interface circuits 156.

In operation, video processing component 102 receives video data on node 101 and produces display pixel data representing luminance values of pixels that are to be displayed. The video data 101 represents image source data that is typically received from a host device with pixel data on a rectilinear grid, but this is not essential. For example, video data 101 may represent a grid of pixels at any resolution (e.g., 640×480, 848×480, 1280×720, 1920×1080). The raster pattern produced by projection apparatus 100 does not necessarily align with the rectilinear grid in the image source data, and video processing component 102 operates to produce display pixel data that will be displayed at appropriate points on the raster pattern. For example, in some embodiments, video processing component 102 interpolates vertically and/or horizontally between pixels in the source image data to determine display pixel values along the scan trajectory of the raster pattern.

Video processing component 102 may include any circuitry capable of performing the functions described. For example, in some embodiments, video processing component 102 includes digital circuits capable of performing interpolation such as multipliers, shifters, and adders. Also for example, in some embodiments, video processing component 102 may include hardware circuits and may also include a processor that executes instructions.

Light source 164 receives commanded luminance values from video processing component 102 and produces light beam 112 having grayscale values in response thereto. Light source 164 may be monochrome or may include multiple different color light sources. For example, in some embodiments, light source 164 includes red, green, and blue light sources. In these embodiments, video processing component 102 outputs display pixel luminance values corresponding to each of the red, green, and blue light sources. Also for example, light produced by light source 164 may be visible or nonvisible. For example, in some embodiments, one or more sources of light within light source 164 may produce infrared (IR) light.

Light beam 112 impinges on scanning platform 114 which is part of a microelectromechanical system (MEMS) based scanner or the like. In some embodiments, additional optical elements are included in the light path between light source 164 and scanning platform 114. For example, apparatus 100 may include collimating lenses, dichroic mirrors, or any other suitable optical elements. Light beam 112 then reflects off scanning mirror 116 to generate a controlled output beam 124. A scanning mirror drive circuit 154 provides one or more drive signal(s) to control the angular motion of scanning mirror 116 to cause output beam 124 to generate a raster scan 126 of pixels on a projection surface 128. In operation, light source 164 is modulated to produce light pulses, and scanning mirror 116 reflects the light pulses to create display pixels as beam 124 traverses raster pattern 126.

Scanning mirror 116 deflects on two axes in response to drive stimuli received on node 193 from mirror drive and control circuits 154. The shape of the raster pattern swept by scanning mirror 116 is a function of the mirror movement on its two axes. For example, in some embodiments, scanning mirror 116 sweeps in a first dimension (e.g., vertical dimension) in response to sawtooth wave stimulus, resulting in a substantially linear and unidirectional vertical sweep. Also for example, in some embodiments, scanning mirror 116 sweeps in a second dimension (e.g., horizontal dimension) according to a sinusoidal stimulus, resulting in a substantially sinusoidal horizontal sweep.

Scanning platform 114 is an example of a scanning mirror assembly that scans light in two dimensions. In some embodiments the scanning mirror assembly includes a single mirror that scans in two dimensions (e.g., on two axes). Alternatively, in some embodiments, scanning platform 114 may be an assembly that includes two scan mirrors, one which deflects the beam along one axis, and another which deflects the beam along a second axis largely perpendicular to the first axis.

Photodetector 180 is shown receiving a reflection from a reflector 132 within the field of view of the projection apparatus. In the example of FIG. 1, the reflection is from a reflective object on a user's finger being used as a pointer. In some embodiments, a reflector may be integrated into a pointing device, or may be applied to any object with glue, tape, or any other means. The reflector may incorporate any type of reflective device or material that can reflect all or a portion of output beam 124. For example, in some embodiments, reflector 132 may be a corner reflector or a retroreflector. Also for example, in other embodiments, reflector 132 may include reflective tape with diffusive qualities.

In some embodiments, reflector 132 is part of a separate object. For example, in some embodiments, reflector 132 may be on the end of a stylus used for pointing. Also for example, in some embodiments, reflector 132 may be active or passive. Passive embodiments have been described. Active embodiments may include a light source that emits light when controlled output beam 124 passes over reflector 132. In other active embodiments, reflector 132 may include a radio frequency (RF) source to emit an RF signal when controlled output beam 124 passes over reflector 132.

When controlled output beam 124 passes over reflector 132, light is reflected as shown at 133. The reflected light is sensed by photodetector (PD) 180. As described more fully below, the timing of the reflected light can be compared to the timing of the raster scan 126 to determine the location of the reflector 132 relative to the image painted by raster scan 126. For example, when a particular pixel is reflected by reflector 132, determining the location of that pixel within the raster scan 126 also determines the location of the reflector within the raster scan 126.

In some embodiments, light source 164 sources nonvisible light such as infrared light. In these embodiments, PD 180 is able to detect the same wavelength of nonvisible light. For example, in some embodiments, light source 164 may be an infrared laser diode that produces light with a wavelength of substantially 808 nanometers (nm). The wavelength of light is not a limitation of the present invention. Any wavelength, visible or nonvisible, may be used without departing from the scope of the present invention.

Virtual segmentation circuits 148 include segment storage device 150 and gating mechanism 152. Segment storage device 150 may be any storage device capable of storing information. For example, in some embodiments, segment storage device 150 includes a memory device such as a random access memory. Segment storage device 150 holds information that defines regions, or "segments," of the display area within the field of view of the projection apparatus. In some embodiments, virtual segmentation defines one or more regions of the display in which user interaction will be recognized. For example, in embodiments represented by FIG. 1, segment storage device 150 stores information that defines substantially rectangular region 130, and reflections are recognized when they emanate from within the region defined at 130, and are not recognized when they emanate from outside the region defined at 130. Region 130 is referred to herein as being substantially rectangular because although it may appear perfectly rectangular from a distance, region 130 may slightly deviate from being perfectly rectangular owing to the raster scanning nature of the projection apparatus.

Gating mechanism 152 receives an indication of reflected light from PD 180, and also receives information related to defined regions from segment storage device 150. Gating mechanism 152 functions to either gate or pass the indication of reflected light, thereby either recognizing the reflection or not recognizing the reflection. When the reflected light is from within a defined region, gating mechanism 152 recognizes the indication of reflected light and passes the indication to the user interface circuits 156. When the reflected light is not from within a defined region, gating mechanism 152 does not recognize the indication of reflected light, and nothing is sent to user interface circuits 156.

Gating mechanism 152 may be implemented using any type of circuit suitable to conditionally recognize the indication of reflected light. For example, in some embodiments, gating mechanism 152 includes logic circuitry that receives digital signals from both segment storage device 150 and PD 180, and outputs a logic signal to user interface circuits 156. In other embodiments, gating mechanism 152 includes power circuits to conditionally source power to PD 180 based on information received from segment storage device 150.

In some embodiments, mirror drive and control circuit 154 has knowledge of the position of scanning mirror 116, from which the position of a reflection may be derived. For example, mirror drive and control circuits 154 may receive one or more sync signals from scanning platform 114 describing horizontal and vertical mirror positional information. Mirror drive and control circuits 154 may output the mirror position information at 151. Mirror drive and control circuits 154 may also generate and distribute a pixel clock at 151. Various other circuits receive the mirror position information and pixel clock. For example, video processing component 102 may utilize the mirror position information and pixel clock to determine what image pixel information is to be used to generate display pixel information and when. Also for example, segment storage device 150 may use the mirror position information to determine whether the raster scan is currently inside or outside a defined region, and whether to cause gating mechanism 152 to gate indications of received reflections. Also for example, user interface circuits 156 may utilize the mirror position information to determine the x,y location of a reflector within the projector's field of view.

User interface circuits 156 may be any type of circuit that can receive an indication of reflected light and determine an x,y location of the reflector within the display field. In some embodiments, user interface circuits 156 include a processor and a memory to hold instructions that are executed by the processor. In other embodiments, user interface circuits 156 include one or more application specific integrated circuits.

In some embodiments, the order of operations of virtual segmentation circuits 148 and user interface circuits 156 are modified from that which is shown in FIG. 1. For example, an x,y location of a reflector may first be determined by user interface circuits 156 based on the time that reflection is received. The x,y location information may then be passed to virtual segmentation circuits 148 for gating based on one or more virtual segment definitions. The x,y location may then be packetized for consumption by an application layer or operating system (OS) in general. In these embodiments, gating mechanism 152 may include a processor and memory for storing instructions. When executed by the processor, the instructions may cause gating mechanism 152 to gate delivery of x,y location information based on one or more virtual segment definitions.

As described above, reflections from within the projector's field of view are gated in real-time as they are received, rather than masking reflections based on post-processing of captured images. The real-time gating of reflections based on the location provides a simple yet robust segmentation apparatus that does not require a separate imaging apparatus such as a camera.

Figures 2, 3, 4:
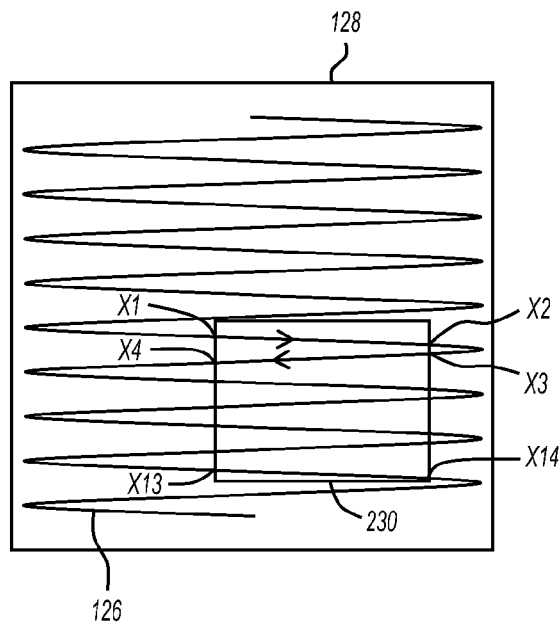
FIG. 2 shows a scanned display with virtual segmentation in accordance with various embodiments of the present invention.
FIGS. 3 and 4 show virtual segment storage contents in accordance with various embodiments of the present invention.

FIG. 2 shows a scanned display with virtual segmentation in accordance with various embodiments of the present invention. Region 230 is defined as a rectangle within the raster pattern. The first raster scan line enters region 230 at pixel X1 and exits region 230 at pixel X2. The second raster scan line enters region 230 at pixel X3 and exits region 230 at pixel X4. The last raster scan line enters region 230 at pixel X13 and exits region 230 at pixel X14.

As described above with reference to FIG. 1, the information defining region 230 is held in a segment storage device such as segment storage device 150. In some embodiments, the region is defined by storing pixel identifying information used to turn reflection recognition on or off. For example, as shown in FIG. 3, a region may be defined using a series of records that list pixels at the horizontal extents of raster lines that intersect the region, along with information describing whether to turn reflection recognition on or off. In other embodiments, the region is defined by storing times at which reflection recognition is turned on or off. For example, as shown in FIG. 4, a region may be defined using a series of records that list times that correspond to pixels at the horizontal extents of raster lines that intersect the region, along with information describing whether to turn reflection recognition on or off. In still other embodiments, the region is defined by storing region information for every pixel to be displayed.

FIGS. 3 and 4 show virtual segment storage contents in accordance with various embodiments of the present invention. FIG. 3 shows a region defined using pixel identifying information at the horizontal extents of raster scan lines that intersect the region. The example of FIG. 3 defines region 230 (FIG. 2). Reflection recognition is turned on when raster scan lines enter region 230 at pixels X1, X3, and X13, and is turned off when raster scan lines exit region 230 at pixels X2, X4, and X14.

FIG. 4 shows a region defined using times at which the raster scan passes the horizontal extents of the region. The example of FIG. 4 defines region 230 (FIG. 2). Reflection recognition is turned on at times T1, T3, and T13, and is turned off at times T2, T4, and T14, where the times Tn correspond to times at which pixels Xn are displayed.

In the examples of FIGS. 1-4, segment storage device 150 may provide a digital signal to gating mechanism 152 that is enabled when reflection recognition is turned on, thereby allowing gating mechanism 152 to pass detected reflection information to user interface circuits 156. Likewise, segment storage device 150 may provide a digital signal to gating mechanism 152 that is disabled when reflection recognition is turned off, thereby causing gating mechanism 152 to block detected reflection information from reaching user interface circuits 156.

Further, in the embodiments represented by FIGS. 1-4, the raster pattern 126 of pixels includes a plurality of lines of pixels, and the segment storage device 150 stores information used to turn reflection recognition on and off no more than one time per line of pixels. In other embodiments, multiple regions are defined, and reflection recognition may be turned on and off more than one time per line of pixels.

Figure 5:
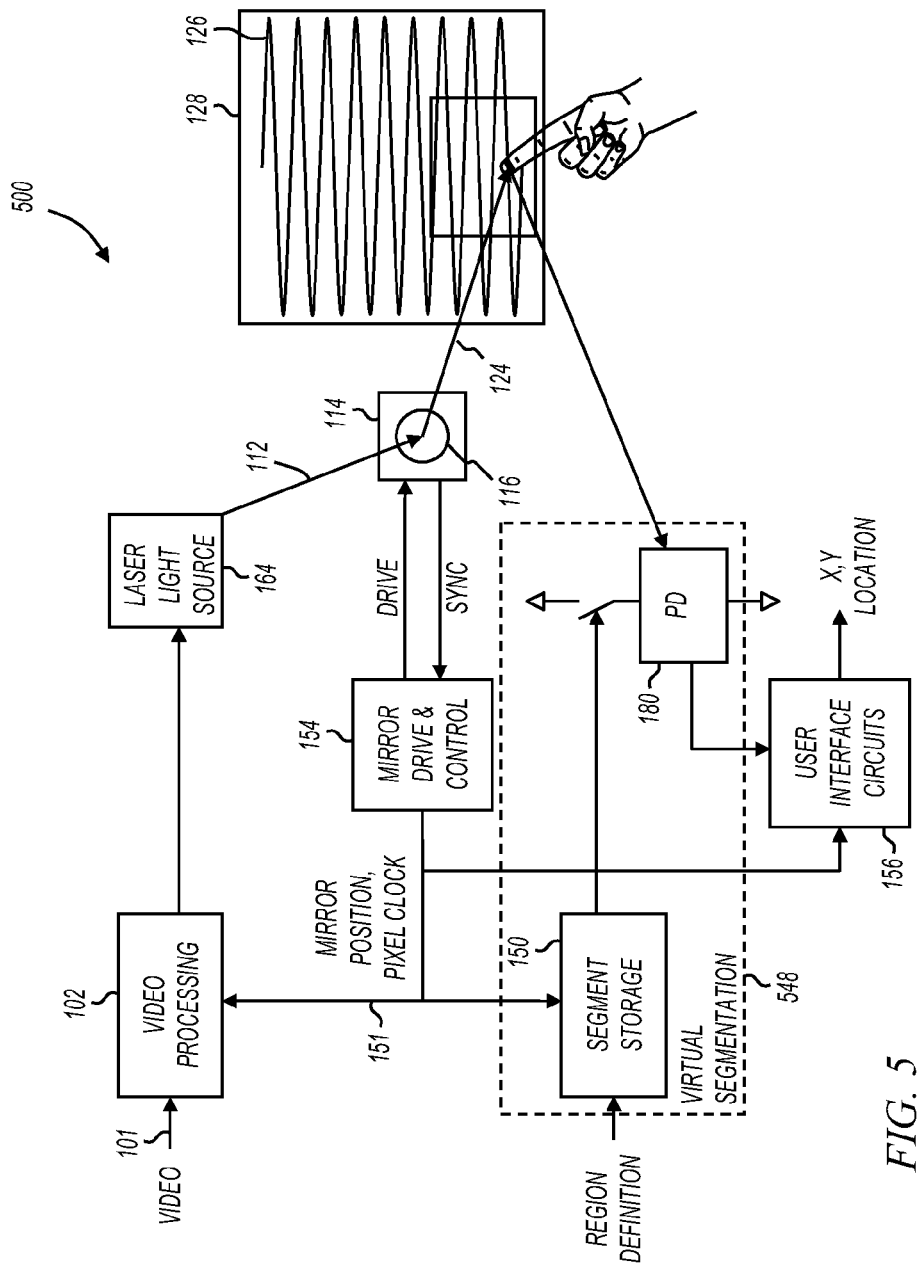
FIG. 5 shows a projection apparatus with virtual segmentation of the display in accordance with various embodiments of the present invention.

FIG. 5 shows a projection apparatus with virtual segmentation of the display in accordance with various embodiments of the present invention. Projection apparatus 500 is similar to projection apparatus 100 (FIG. 1), with the exception of virtual segmentation circuits 548. Virtual segmentation circuits 548 include segment storage device 150 and PD 180, but rather than gating a signal output from PD 180, the gating mechanism controls the source of power to PD 180. When reflection recognition is turned on, power is applied to PD 180, and when reflection recognition is turned off, power is removed from PD 180.

Figure 6:
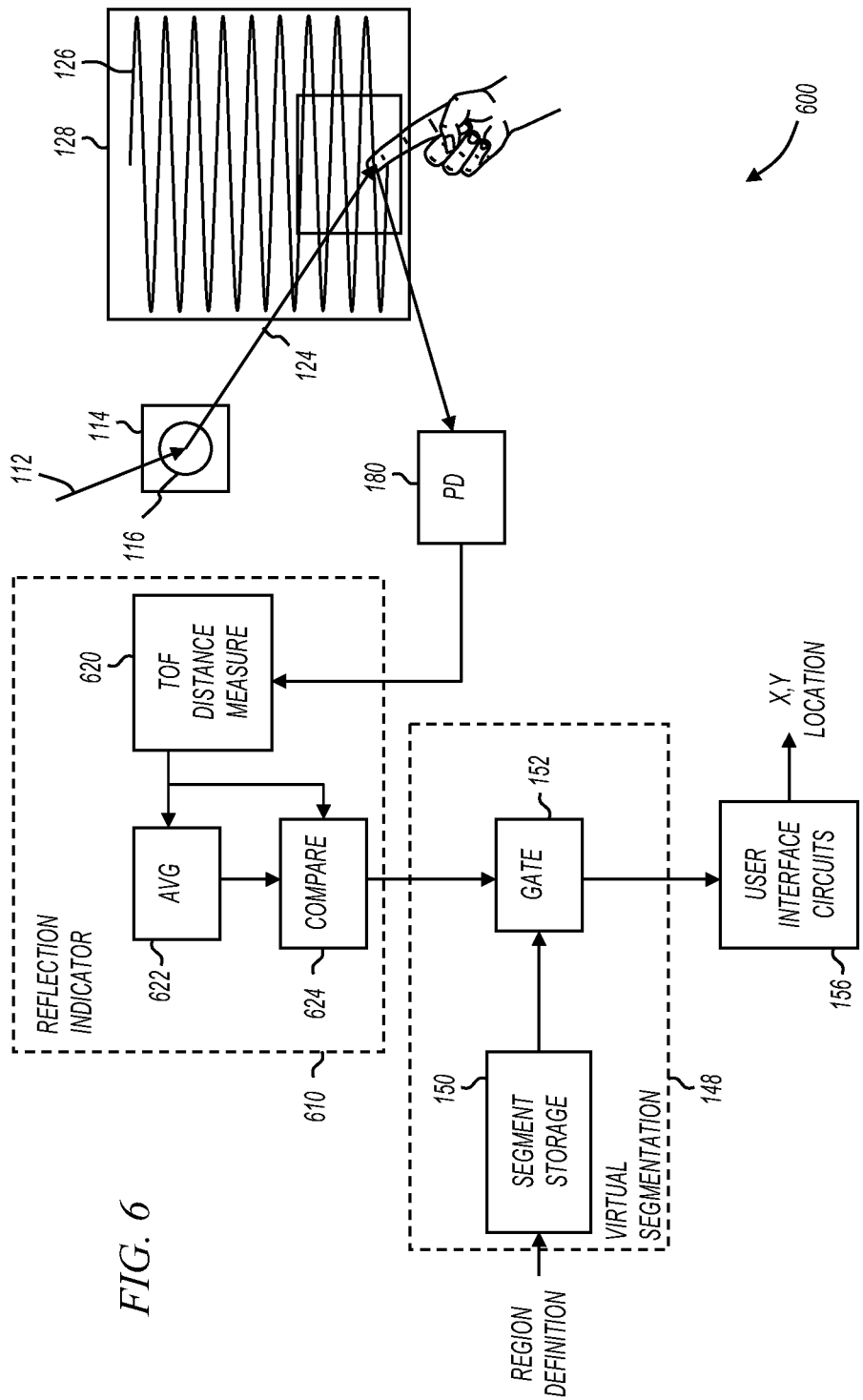
FIG. 6 shows virtual segmentation of a scanned display using time of flight (TOF) distance measurements in accordance with various embodiments of the present invention.

FIG. 6 shows virtual segmentation of a scanned display using time of flight (TOF) distance measurements in accordance with various embodiments of the present invention. Projection apparatus 600 is shown starting with light beam 112 impinging on scanning mirror 114. Many other circuits (e.g., video processing, light sources) have been intentionally omitted from FIG. 6. Any suitable circuits may be included to produce the modulated light beam at 112.

Projection apparatus 600 includes reflection indicator 610 and virtual segmentation circuits 148. Reflection indicator 610 includes TOF distance measurement circuits 620, averaging circuit 622, and comparator 624. Reflection indicator 610 receives an output signal from PD 180 and provides virtual segmentation circuits 148 with a reflection indication that indicates whether an object is in the field of view in front of projection surface 128.

Projection apparatus 600 measures the time-of-flight of all modulated light pulses, and determines if an object is in the field of view based on differences in time-of-flight measurements. In operation, the output of PD 180 is provided to TOF distance measurement circuits 620, which measures the round-trip time-of-flight for each pixel. TOF measurement techniques are known, and are not further described herein. TOF distance measurement circuits 620 provide a distance measurement to averaging circuit 622 for each pixel. Averaging circuit 622 determines a moving average of the distance measurement. The output of averaging circuit 622 represents an average distance to projection surface 128. Comparator 624 compares an instantaneous (or shorter moving average) TOF measurement with the output of averaging circuit 622, and provides a reflection indication to virtual segmentation circuit 148 when the average distance measurement exceeds the instantaneous distance measurement by a threshold amount. The threshold amount may be hard-coded in comparator 624, or may be a third input to comparator 624. Virtual segmentation then proceeds as described above.

Figure 7:
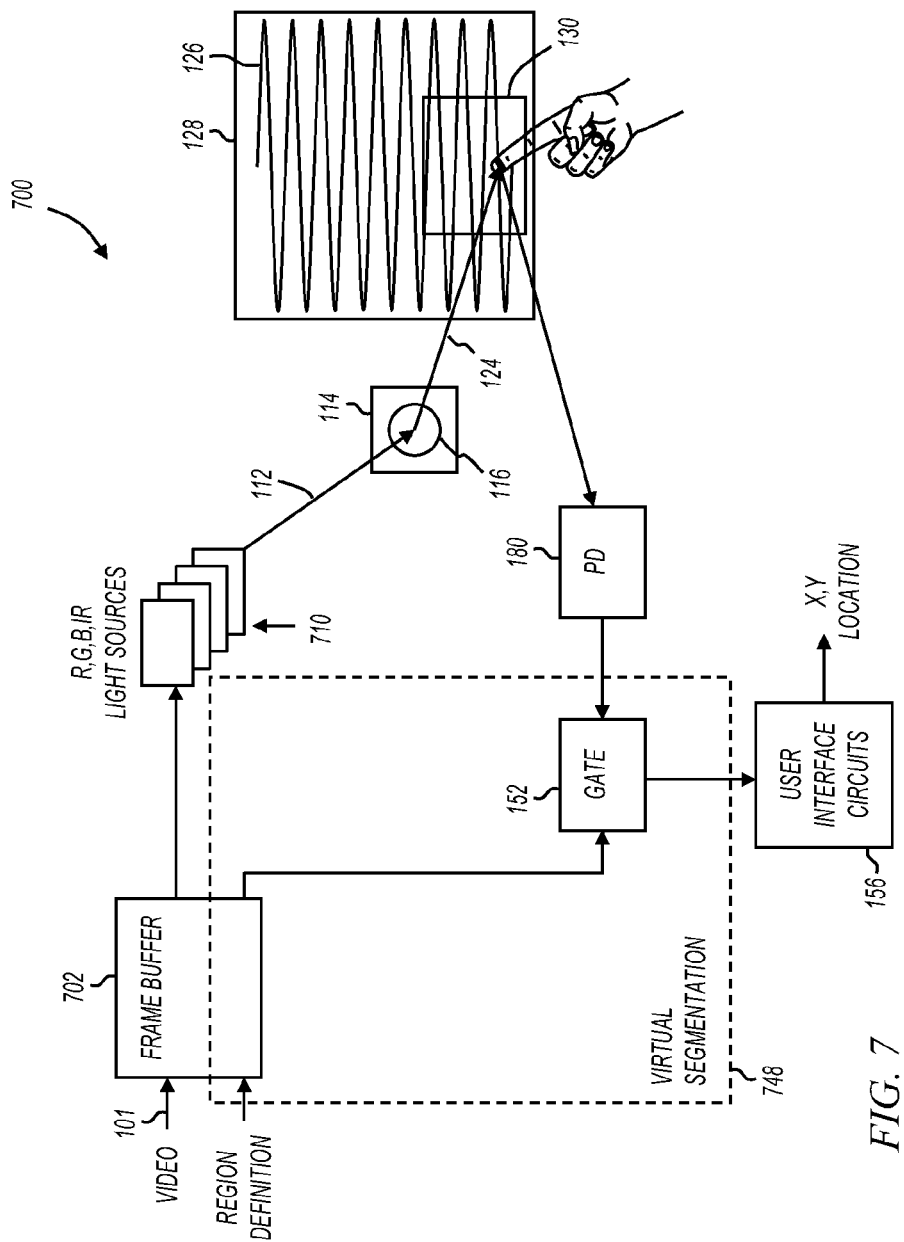
FIG. 7 shows a projection apparatus with virtual segmentation storage in a frame buffer in accordance with various embodiments of the present invention.

FIG. 7 shows a projection apparatus with virtual segmentation storage in a frame buffer in accordance with various embodiments of the present invention. Other than components already described, projection apparatus 700 includes frame buffer 702 and light sources 710. In some embodiments, frame buffer 702 stores pixel information for one video frame or stores information for the pixels in one raster scan. In embodiments represented by FIG. 7, frame buffer 702 also includes the region definition(s) used for virtual segmentation. Accordingly, virtual segmentation circuits 748 are shown including a portion of frame buffer 702 along with gating mechanism 152.

Light sources 710 includes red (R), green (G), blue (B), and infrared (IR) light sources. In some embodiments, red, green, and blue light sources are modulated for every pixel to faithfully reproduce image pixels, while the IR light source is modulated at a constant amplitude for every pixel. In these embodiments, PD 180 is sensitive to IR light, and provides virtual segmentation circuits 748 with an indication of reflected IR light.

In some embodiments, the visible image displayed on projection surface 128 includes a visible indicator of the extents of region 130. For example, a red box may be drawn at the extents of region 130 in order to provide a user an indication of the region definition. In other embodiments, the region is defined without a visible indication being displayed. In some embodiment, a video host may insert the visible extents into the video data 101.

FIGS. 8 and 9 show frame buffer contents in accordance with various embodiments of the present invention. Example contents of frame buffer 702 are shown in FIG. 8. The frame buffer is arranged in rows and columns of pixels, with details of a representative pixel 810 being shown in FIG. 9. Representative pixel 810 includes grayscale information for red, green, blue, and infrared lasers, and also includes a segment field "S" to reflect whether the pixel is inside a defined region of a segmented display. In some embodiments, the "S" field may be provided to gating mechanism 152 when the corresponding R, G, B, IR pixel information is output. The "S" field may then allow a reflection indication to pass and be recognized, or may cause a reflection indication to be gated and not recognized.

In some embodiments, the "S" field may be a single bit value to indicate whether the pixel is within a defined region. In other embodiments, the "S" field may take on multiple different values corresponding to different defined regions. In these embodiments, the "S" field may not only gate the reflection indication, but it may also determine how a recognized reflection indication is responded to. For example, if two regions are defined, a user interface circuit may vector the x,y location of a pointer to different functions based on the value of the "S" field. In a more concrete example, reflections recognized in a first region of a segmented display may be used to interact with displayed content (e.g., gaming activities), whereas reflections recognized in a second region of the segmented display may be used to interact with menus or to annotate the displayed content.

In some embodiments, the value of the "S" field specifies whether a pixel is within a region as described above. In other embodiments, the value of the "S" field is used to turn on or off reflection recognition at the horizontal extents of the region(s) as described above with reference to FIGS. 2-4.

Figure 11:
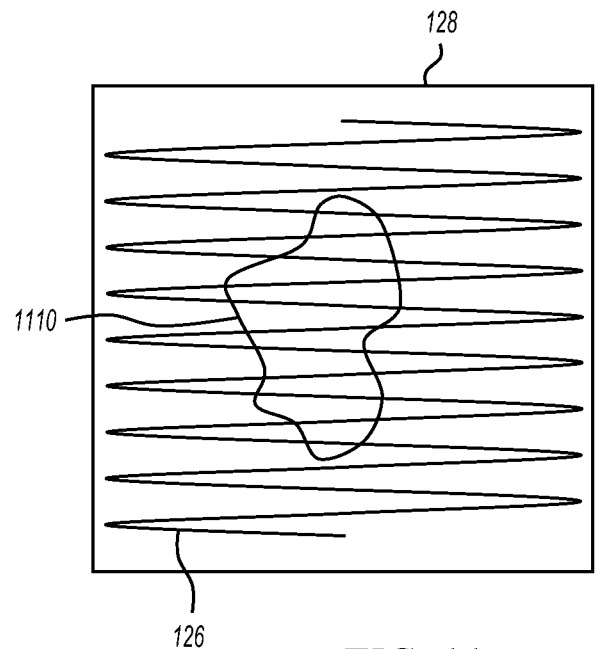
Figure 12:
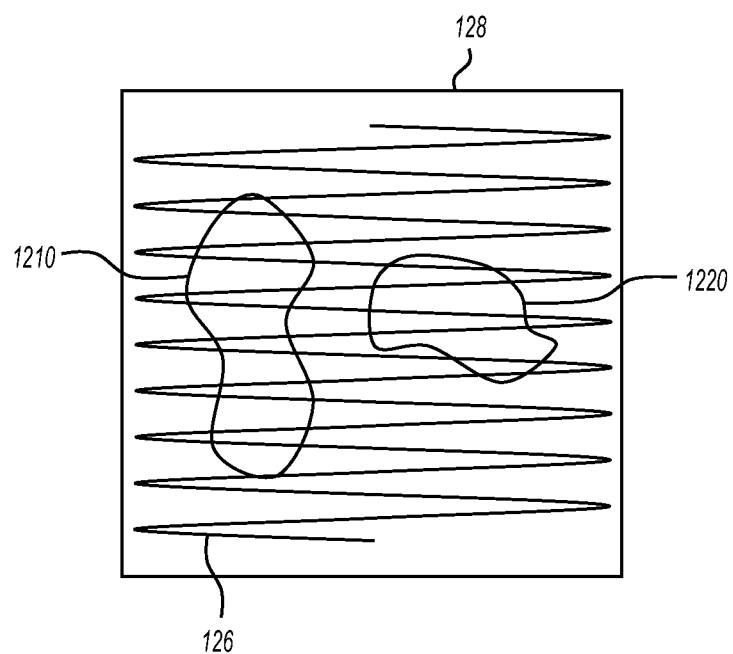

FIGS. 10-12 show examples of virtual segmentation of displays in accordance with various embodiments of the present invention. FIG. 10 shows two substantially rectangular regions 1010, 1020 defined. Regions 1010 and 1020 may be defined in any suitable manner within a segment storage device. For example, the horizontal extents of each region may be stored in a segment storage device along with information describing whether to turn reflection recognition on or off. For some raster lines, reflection recognition may be turned on and off more than once.

FIG. 11 shows a non-rectangular region defined for a virtually segmented display. Region 1110 may be defined in any suitable manner within a segment storage device. For example, the horizontal extents of each raster line that intersects region 1110 may be stored in a segment storage device along with information describing whether to turn reflection recognition on or off. In the example of FIG. 11, reflection recognition is turned on and off no more than once per raster line, but this is not a limitation of the present invention. A single region of a segmented display may have a shape that requires reflection recognition to be turned on and off more than once in a single raster line.

As demonstrated by FIG. 11, the virtual segmentation provided by the various invention embodiments described herein allows for arbitrarily shaped regions with little or no increase in complexity. Reflections are individually gated based on pixel information or time information without regard to an outline shape of any defined regions.

FIG. 12 shows multiple non-rectangular regions defined for a virtually segmented display. Regions 1210 and 1220 may be defined in any suitable manner within a segment storage device. For example, the horizontal extents of each region may be stored in a segment storage device along with information describing whether to turn reflection recognition on or off. For some raster lines, reflection recognition may be turned on and off more than once.

In general, any number of arbitrarily shaped regions may be defined for virtual segmentation as described herein. Recognized reflections within different regions may be used for the same purpose, or for different purposes. For example, reflections recognized in different regions may be responded to by different software programs running on a processor.

Figure 13:
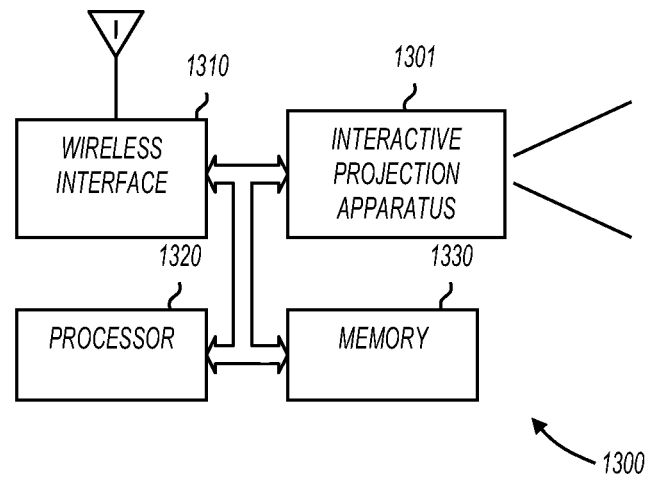
FIG. 13 shows a block diagram of a mobile device in accordance with various embodiments of the present invention.

FIG. 13 shows a block diagram of a mobile device in accordance with various embodiments of the present invention. As shown in FIG. 13, mobile device 1300 includes wireless interface 1310, processor 1320, memory 1330, and interactive projection apparatus 1301. Interactive projection apparatus 1301 includes virtual segmentation circuitry as described above. Interactive projection apparatus 1301 may include circuitry to define any number and/or shape of virtual segments as described above. For example, interactive projection apparatus 1301 may store virtual segment information in a frame buffer, or in a separate segment storage device. Interactive projection apparatus 1301 may include any of the projection apparatus described herein, including apparatus 100 (FIG. 1), apparatus 500 (FIG. 5), apparatus 600 (FIG. 6), or apparatus 700 (FIG. 7).

Interactive projection apparatus 1301 may receive image data from any image source. For example, in some embodiments, interactive projection apparatus 1301 includes memory that holds still images. In other embodiments, interactive projection apparatus 1301 includes memory that includes video images. In still further embodiments, interactive projection apparatus 1301 displays imagery received from external sources such as connectors, wireless interface 1310, a wired interface, or the like.

Wireless interface 1310 may include any wireless transmission and/or reception capabilities. For example, in some embodiments, wireless interface 1310 includes a network interface card (NIC) capable of communicating over a wireless network. Also for example, in some embodiments, wireless interface 1310 may include cellular telephone capabilities. In still further embodiments, wireless interface 1310 may include a global positioning system (GPS) receiver. One skilled in the art will understand that wireless interface 1310 may include any type of wireless communications capability without departing from the scope of the present invention.

Wireless interface 1310 (and any other network interface device) may allow multiple interactive projectors to share content along with virtual segmentation information. For example, display content may be shared between two distant video hosts with interactive projectors. Two similar or disparate regions may be virtually segmented on the same shared content between the hosts, but with only the pertinent segment active in each of the hosts. One example application of this technology is a projected tennis game played by two different players in different geographical locations. The same video content may be displayed for both players. The game may be played with a view from above with a player on the right (in a first geographical location) having an active region defined at the right side of the displayed content and a player on the left (in a second geographical location) having an active region defined at the left side of the displayed content.

Processor 1320 may be any type of processor capable of communicating with the various components in mobile device 1300. For example, processor 1320 may be an embedded processor available from application specific integrated circuit (ASIC) vendors, or may be a commercially available microprocessor. In some embodiments, processor 1320 provides image or video data to interactive projection apparatus 1301. The image or video data may be retrieved from wireless interface 1310 or may be derived from data retrieved from wireless interface 1310. For example, through processor 1320, interactive projection apparatus 1301 may display images or video received directly from wireless interface 1310. Also for example, processor 1320 may provide overlays to add to images and/or video received from wireless interface 1310, or may alter stored imagery based on data received from wireless interface 1310 (e.g., modifying a map display in GPS embodiments in which wireless interface 1310 provides location coordinates).

Figure 14:
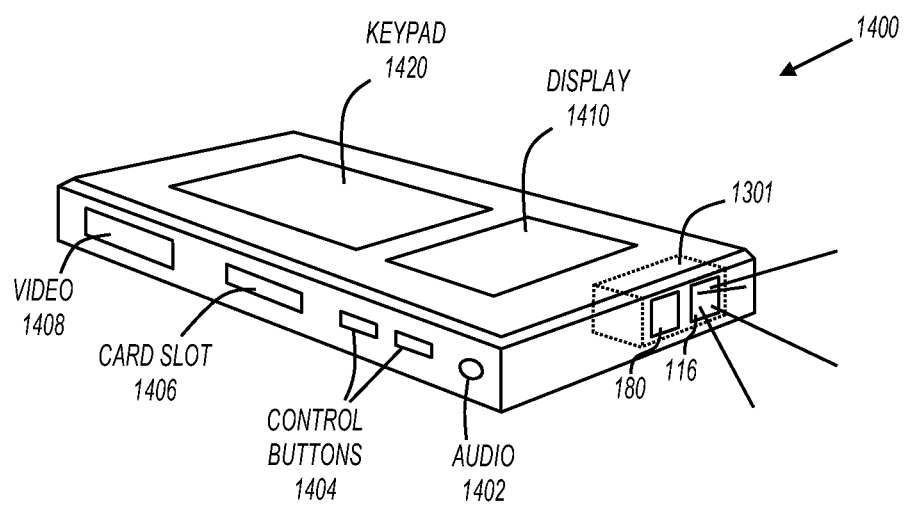
FIG. 14 shows a mobile device in accordance with various embodiments of the present invention.

FIG. 14 shows a mobile device in accordance with various embodiments of the present invention. Mobile device 1400 may be a hand held interactive projection device with or without communications ability. For example, in some embodiments, mobile device 1400 may be a handheld interactive projection apparatus with little or no other capabilities. Also for example, in some embodiments, mobile device 1400 may be a device usable for communications, including for example, a cellular phone, a smart phone, a personal digital assistant (PDA), a global positioning system (GPS) receiver, or the like. Further, mobile device 1400 may be connected to a larger network via a wireless (e.g., WiMax) or cellular connection, or this device can accept and/or transmit data messages or video content via an unregulated spectrum (e.g., WiFi) connection.

Mobile device 1400 includes interactive projection apparatus 1301. Interactive projection apparatus 1301 may be any of the interactive projection devices described herein. Interactive projection apparatus 1301 is shown including scanning mirror 116 and PD 180. Mobile device 1400 also includes many other types of circuitry; however, they are intentionally omitted from FIG. 14 for clarity.

Mobile device 1400 includes display 1410, keypad 1420, audio port 1402, control buttons 1404, card slot 1406, and audio/video (A/V) port 1408. None of these elements are essential. For example, mobile device 1400 may only include interactive projection apparatus 1301 without any of display 1410, keypad 1420, audio port 1402, control buttons 1404, card slot 1406, or A/V port 1408. Some embodiments include a subset of these elements. For example, an accessory projector product that includes interactive projection capabilities may include interactive projection apparatus 1301, control buttons 1404 and A/V port 1408.

Display 1410 may be any type of display. For example, in some embodiments, display 1410 includes a liquid crystal display (LCD) screen. Display 1410 may or may not always display the image projected by interactive projection apparatus 1301. For example, an accessory product may always display the projected image, whereas a mobile phone embodiment may project one image while displaying different content on display 1410. Keypad 1420 may be a phone keypad or any other type of keypad.

A/V port 1408 accepts and/or transmits video and/or audio signals. For example, A/V port 1408 may be a digital port, such as a high definition multimedia interface (HDMI) interface that accepts a cable suitable to carry digital audio and video data. Further, A/V port 1408 may include RCA jacks to accept or transmit composite inputs. Still further, A/V port 1408 may include a VGA connector to accept or transmit analog video signals. In some embodiments, mobile device 1400 may be tethered to an external signal source through A/V port 1408, and mobile device 1400 may project content accepted through A/V port 1408. In other embodiments, mobile device 1400 may be an originator of content, and A/V port 1408 is used to transmit content to a different device.

Audio port 1402 provides audio signals. For example, in some embodiments, mobile device 1400 is a media player device that can store and replay audio and video. In these embodiments, the video may be projected by interactive projection apparatus 1301 and the audio may be output at audio port 1402.

Mobile device 1400 also includes card slot 1406. In some embodiments, a memory card inserted in card slot 1406 may provide a source for audio to be output at audio port 1402 and/or video data to be projected by interactive projection apparatus 1301. Card slot 1406 may receive any type of solid state memory device, including for example, Multimedia Memory Cards (MMCs), secure digital (SD) memory cards, and Smart Media cards. The foregoing list is meant to be exemplary, and not exhaustive.

Figure 15:
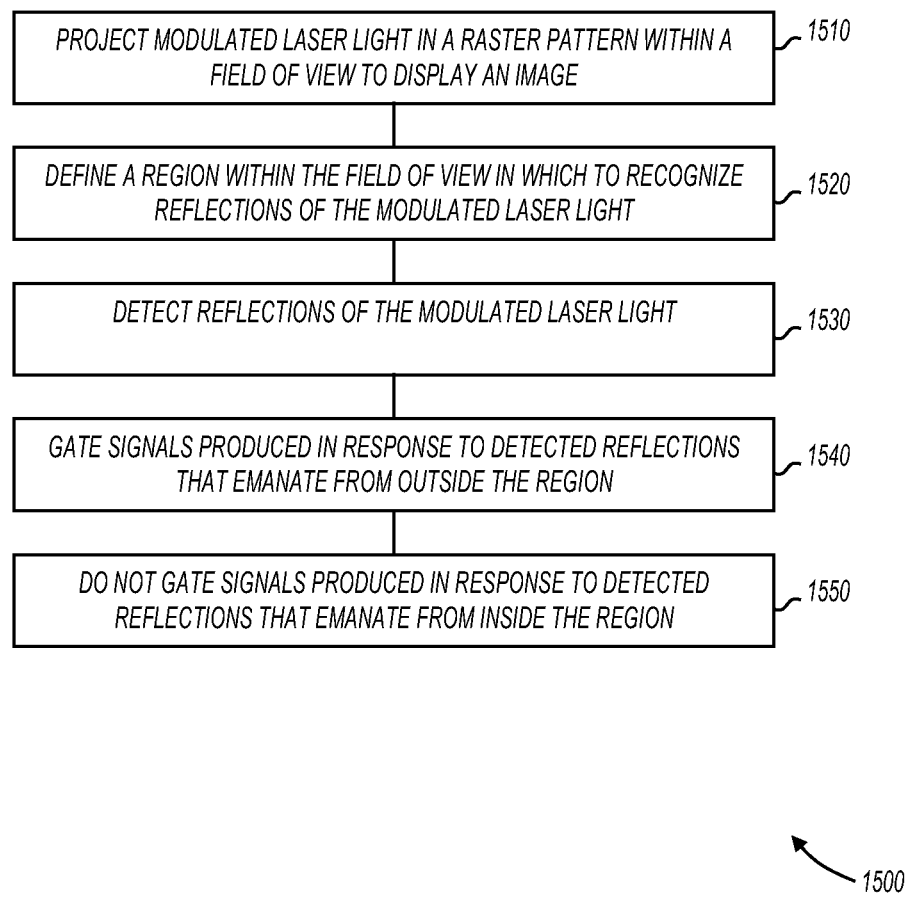
FIG. 15 shows a flow diagram of methods in accordance with various embodiments of the present invention.

FIG. 15 shows a flow diagram of methods in accordance with various embodiments of the present invention. In some embodiments, method 1500, or portions thereof, is performed by an interactive projection apparatus, embodiments of which are shown in previous figures. In other embodiments, method 1500 is performed by a series of circuits or an electronic system. Method 1500 is not limited by the particular type of apparatus performing the method. The various actions in method 1500 may be performed in the order presented, or may be performed in a different order. Further, in some embodiments, some actions listed in FIG. 15 are omitted from method 1500.

Method 1500 is shown beginning with block 1510. As shown at 1510, modulated laser light is projected in a raster pattern within a field of view to display an image. The actions of 1510 may be performed by a scanning laser projector, embodiments of which are described with reference to earlier figures.

At 1520, a region is defined within the field of view in which to recognize reflections of the modulated laser light. The region may be defined by a user or by a machine that is generating image content. In some embodiments, the region definition is stored in a segment storage device such as segment storage device 150 (FIG. 1).

At 1530, reflections of the modulated laser light are detected. In some embodiments, the reflection is from a single pixel. For example, the reflection may emanate from a retroreflector on an object being used as a pointer. In other embodiments, the reflection may be determined by measuring differences in time-of-flight of pixels. When a pixel (or group of pixels) is determined to be closer to the scanning laser projector, then a reflection has been detected.

At 1540, signals produced in response to detected reflections that emanate from outside the region are gated. In some embodiments, this is accomplished by a gating mechanism such as a switch or logic gate that blocks the detected reflection signal based on the region defined at 1520.

At 1550, signals produced in response to detected reflections that emanate from within the region are not gated. In some embodiments, this is accomplished by the gating mechanism allowing the detected reflection signal to pass on to user interface circuits based on the region defined at 1520.

Although the present invention has been described in conjunction with certain embodiments, it is to be understood that modifications and variations may be resorted to without departing from the scope of the invention as those skilled in the art readily understand. Such modifications and variations are considered to be within the scope of the invention and the appended claims.

What is claimed is:

1. An apparatus comprising:
   a laser light source to produce modulated laser light;
   a scanning mirror to reflect the modulated laser light in a raster pattern of pixels;
   a photodetector to detect reflections of the modulated laser light;
   a storage device to store information that defines a region of pixels in the raster pattern; and
   a gating mechanism responsive to the storage device to only allow recognition of reflections of modulated laser light corresponding to pixels within the region.

2. The apparatus of claim 1 wherein the storage device stores pixel identifying information used to turn reflection recognition on or off.

3. The apparatus of claim 1 wherein the storage device stores time information used to turn reflection recognition on or off.

4. The apparatus of claim 1 wherein the gating mechanism gates an output signal from the photodetector.

5. The apparatus of claim 1 wherein the gating mechanism controls power to photodetector.

6. The apparatus of claim 1 wherein the raster pattern of pixels includes a plurality of lines of pixels, and the storage device stores information used to turn reflection recognition on and off no more than one time per line of pixels.

7. The apparatus of claim 1 wherein the raster pattern of pixels includes a plurality of lines of pixels, and the storage device stores information used to turn reflection recognition on and off multiple times per line of pixels.

8. The apparatus of claim 1 wherein the storage device includes information to define a substantially rectangular area.

9. The apparatus of claim 1 wherein the storage device stores information used to define a plurality of substantially rectangular areas.

10. The apparatus of claim 1 wherein the storage device stores information used to define a nonrectangular area.

11. The apparatus of claim 1 wherein the storage device stores information used to define a plurality of nonrectangular areas.

12. The apparatus of claim 1 wherein the storage device comprises a frame buffer.

13. The apparatus of claim 12 wherein the information stored in the frame buffer comprises information for each pixel within the region.

14. The apparatus of claim 12 wherein the information stored in the frame buffer comprises information for pixels at horizontal extents of the region.

15. The apparatus of claim 1 wherein the laser light source produces infrared light.

16. An apparatus comprising:
    a scanning laser projector to project pixels into a field of view;
    a photodetector to detect reflected pixels;
    a user interface circuit to respond to reflected pixels; and
    a virtual segmentation circuit to define a region in the field of view within which the user interface circuit responds to reflected pixels by gating signals output from the photodetector outside the region defined by the virtual segmentation circuit.

17. The apparatus of claim 16 wherein the virtual segmentation circuit comprises a storage device that stores information identifying pixels at horizontal extents of the region.

18. The apparatus of claim 16 wherein the virtual segmentation circuit comprises a storage device that stores information identifying pixels within the region.

19. The apparatus of claim 16 further comprising a wireless interface.

20. A method comprising:
    projecting modulated laser light in a raster pattern within a field of view to display an image;
    defining a region within the field of view in which to recognize reflections of the modulated laser light;
    detecting reflections of the modulated laser light;
    gating signals produced in response to detected reflections that emanate from outside the region; and
    not gating signals produced in response to detected reflections that emanate from inside the region.

21. The method of claim 20 wherein defining a region comprises modifying frame buffer contents for pixels that are within the region.

22. The method of claim 20 wherein defining a region comprises modifying frame buffer contents for pixels at horizontal extents of the region.

* * * * *